United States Patent
Cambruzzi et al.

(10) Patent No.: US 11,480,424 B2
(45) Date of Patent: Oct. 25, 2022

(54) LOCATING SYSTEM AND METHOD FOR DETERMINING A CURRENT POSITION IN AN ELEVATOR SHAFT OF AN ELEVATOR SYSTEM

(71) Applicant: Inventio AG, Hergiswil (CH)

(72) Inventors: Andrea Cambruzzi, Zurich (CH); Erich Bütler, Ebikon (CH); Philipp Zimmerli, Härkingen (CH); Raphael Bitzi, Ebikon (CH)

(73) Assignee: INVENTIO AG, Hergiswil (CH)

( * ) Notice: Subject to any disclaimer, the term of this patent is extended or adjusted under 35 U.S.C. 154(b) by 322 days.

(21) Appl. No.: 16/642,416

(22) PCT Filed: Sep. 11, 2018

(86) PCT No.: PCT/EP2018/074362
§ 371 (c)(1),
(2) Date: Feb. 27, 2020

(87) PCT Pub. No.: WO2019/063277
PCT Pub. Date: Apr. 4, 2019

(65) Prior Publication Data
US 2021/0156666 A1 May 27, 2021

(30) Foreign Application Priority Data
Sep. 27, 2017 (EP) .................................. 17193504

(51) Int. Cl.
*G01B 11/00* (2006.01)
*B66B 19/00* (2006.01)
(Continued)

(52) U.S. Cl.
CPC ............ *G01B 11/002* (2013.01); *B66B 19/00* (2013.01); *G01C 3/02* (2013.01); *G01C 9/12* (2013.01)

(58) Field of Classification Search
CPC .. G01C 3/02; G01C 9/12; B66B 19/00; B66B 19/002; G01B 11/002
See application file for complete search history.

(56) References Cited

U.S. PATENT DOCUMENTS

| | | | |
|---|---|---|---|
| 5,495,990 A * | 3/1996 | Tamura | B65H 54/34 |
| | | | 242/475.7 |
| 2005/0005809 A1* | 1/2005 | Neale | A62B 1/02 |
| | | | 104/93 |

(Continued)

FOREIGN PATENT DOCUMENTS

| CN | 101817468 A | 9/2010 |
|---|---|---|
| CN | 105692403 A | 6/2016 |

(Continued)

*Primary Examiner* — Sang H Nguyen
(74) *Attorney, Agent, or Firm* — William J. Clemens; Shumaker, Loop & Kendrick, LLP

(57) ABSTRACT

A locating system for determining a current position in an elevator shaft of an elevator system extending in a main extension direction includes a first distance sensor by which a first distance and a second distance, which second distance is perpendicular to the first distance, from a first reference element can be measured, as well as a tilt sensor by which a rotation about a horizontal first axis and a horizontal second axis perpendicular to the first axis can be measured, and a measuring system by which a position of the locating system can be determined in the main extension direction of the elevator shaft.

17 Claims, 3 Drawing Sheets

38, 40 DISTANCE SENSOR  42 CONTROL APPARATUS
44 TILT SENSOR  48 MEASURING SYSTEM

(51) Int. Cl.
*G01C 3/02* (2006.01)
*G01C 9/12* (2006.01)

(56) References Cited

U.S. PATENT DOCUMENTS

| | | | | |
|---|---|---|---|---|
| 2010/0084204 | A1* | 4/2010 | Iwaki | B62D 55/075 180/9.52 |
| 2011/0067958 | A1* | 3/2011 | Schuster | B66B 5/0006 187/393 |
| 2014/0000985 | A1* | 1/2014 | Fukui | B66B 7/06 187/247 |
| 2014/0347649 | A1* | 11/2014 | Gehrke | G01C 3/08 356/4.01 |
| 2015/0310296 | A1* | 10/2015 | Seki | G06T 7/194 382/195 |
| 2017/0038204 | A1* | 2/2017 | Kilpeläinen | B66B 19/00 |
| 2017/0254032 | A1* | 9/2017 | Husar | E01C 23/088 |

FOREIGN PATENT DOCUMENTS

| | | | |
|---|---|---|---|
| CN | 105829234 | A | 8/2016 |
| CN | 106064776 | A | 11/2016 |
| CN | 106429679 | A | 2/2017 |
| EP | 2657171 | A1 | 10/2013 |
| JP | H04213580 | A | 8/1992 |
| JP | H0640679 | A | 2/1994 |
| JP | 2002081936 | A | 3/2002 |
| JP | 2004037203 | A | 2/2004 |
| JP | 2007008675 | A | 1/2007 |
| JP | 2007261794 | A | 10/2007 |
| WO | 2017167719 | A1 | 10/2017 |
| WO | 2018041815 | A1 | 3/2018 |

* cited by examiner

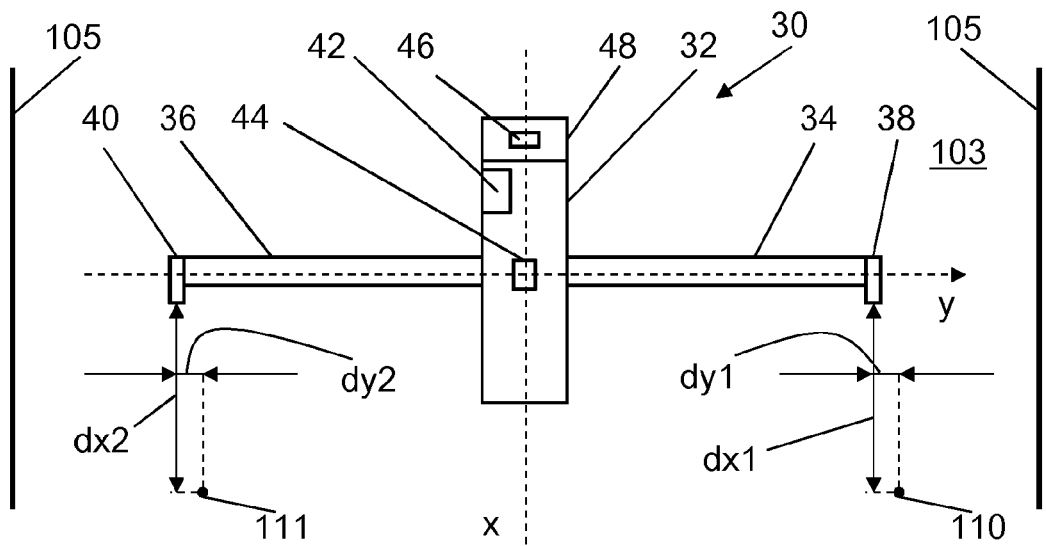
Fig. 1   38, 40 DISTANCE SENSOR   42 CONTROL APPARATUS
44 TILT SENSOR   48 MEASURING SYSTEM
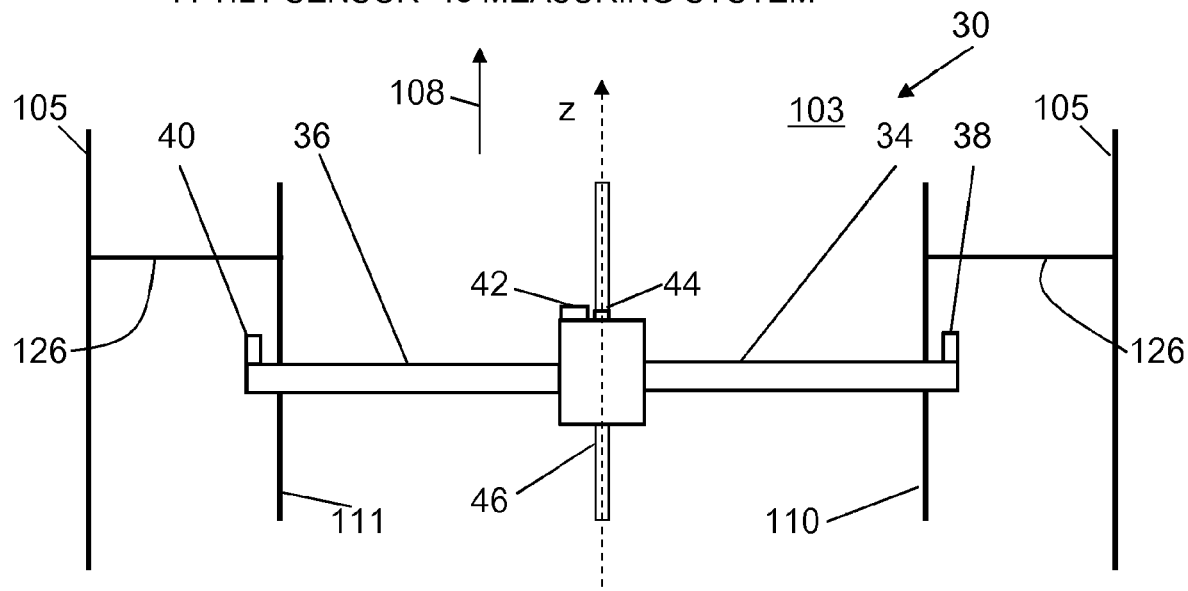
Fig. 2
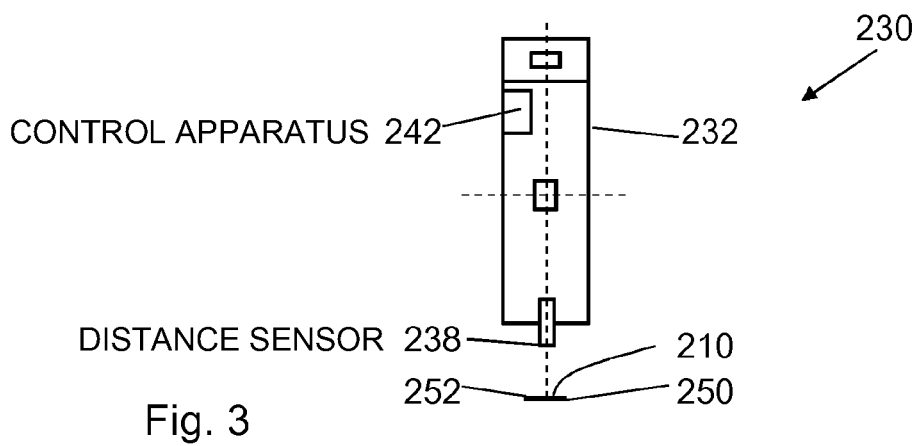
Fig. 3

138 DISTANCE SENSOR
142 CONTROL APPARATUS
144 TILT SENSOR
148 MEASURING SYSTEM

LOCATING SYSTEM AND METHOD FOR DETERMINING A CURRENT POSITION IN AN ELEVATOR SHAFT OF AN ELEVATOR SYSTEM

FIELD

The invention relates to a locating system for determining a current position in an elevator shaft of an elevator installation extending in a main extension direction and to a method for determining a current position of a locating system in an elevator shaft of an elevator installation extending in a main extension direction.

BACKGROUND

The published document WO 2017/167719 A1 describes an installation device for carrying out an installation process in an elevator shaft of an elevator installation using a locating system for determining a current position in the elevator shaft. The installation device has an installation component in the form of an industrial robot which can receive a sensor, by means of which the relative position of an elongate reference element arranged in the elevator shaft relative to at least two different sensor positions and thus positions of the installation component can be determined. The current situation or position of the installation device in the elevator shaft can be concluded from the measurement results of the sensor. It takes a certain amount of time for the two said sensor positions to approach one another. In addition, it is not possible to determine the position during movement of the installation device in the elevator shaft using this locating system.

JPH 04213580 A describes a locating system for determining a current position of a movable platform in the elevator shaft. The locating system has a total of four measuring units, by means of which the orientation of the locating system with respect to two elongate reference elements can be determined. The locating system also has a height measuring system, by means of which the current height of the locating system can be determined. From the orientation relative to the reference elements and the height, the position of the locating system in the elevator shaft is determined.

SUMMARY

By contrast, the problem addressed by the invention is in particular to provide a locating system and a method for determining a current position in an elevator shaft of an elevator installation, by means of which rapid determination of the position is possible and the determination can be carried out in particular independently of the movement state of the locating system. According to the invention, this problem is solved by a locating system for determining a current position in an elevator shaft of an elevator installation extending in a main extension direction and by a method for determining a current position of a locating system in an elevator shaft of an elevator installation extending in a main extension direction.

The locating system according to the invention for determining a current position in an elevator shaft of an elevator installation extending in a main extension direction comprises a first distance sensor by means of which a first distance and a second distance, which is perpendicular to the first distance, from a first reference element can be measured, as well as a tilt sensor by means of which a rotation about a horizontally extending first axis and a horizontally extending second axis, which perpendicular to the first axis can be measured, and a measuring system by means of which a position of the locating system can be determined in the main extension direction of the elevator shaft.

The measured variables from said sensors and said measuring system are evaluated by a control apparatus of the locating system. The control apparatus determines the current position of the locating system in the elevator shaft on the basis of the measured variables, i.e. on the basis of the first distance, the second distance, the rotation about the horizontally extending first axis, the rotation about the horizontally extending second axis, perpendicular to the first axis, and the position of the locating system in the main extension direction. It is therefore provided that the current position of the locating system in the elevator shaft is determined on the basis of said measured variables.

In the locating system according to the invention, the distance sensor for determining the current position can remain in a fixed position relative to said reference element, i.e. it does not have to be brought into different positions relative to the reference element. The current position can thus be determined very rapidly and also while the locating system is moving in the elevator shaft.

The first and second distance from the first reference element is in particular measured simultaneously by means of the distance sensor.

The locating system according to the invention can be used for a wide variety of purposes. It can be used, for example, to determine the position of an installation device in an elevator shaft which can carry out installation steps in an at least partially automated manner. It can also be used to measure an elevator shaft and if necessary to produce a digital model of the elevator shaft. When measuring an elevator shaft, for example by means of a laser scanner, it is necessary for the position of the laser scanner in the elevator shaft to be known. In addition, the locating system according to the invention can also be used to determine installation positions of shaft material, for example of rail brackets or guide rails.

A rigid body has freedom of movement in a total of six degrees of freedom. It can freely change its position by translation along the three vertical axes back/forward (x axis), left/right (y axis) and up/down (z axis) combined with changes in orientation by rotations about the three vertical axes, referred to as roll (rotation about the longitudinal axis or x axis), pitch (rotation about the transverse axis or y axis) and yaw (rotation about the vertical axis or z axis). To unambiguously describe the position of a rigid body such as a locating system, its positions in the direction of said three axes and the rotations about said three axes (x, y and z axes) need to be indicated. The locating system according to the invention is in particular intended to determine said three positions and the three rotations.

The elevator shaft in particular extends predominantly in a main extension direction. The main extension direction of the elevator shaft is to be understood here as the direction in which an elevator car of the completely installed elevator system is moved. The main extension direction thus extends in particular vertically and thus in the z direction, but it can also be inclined relative to the vertical or extend horizontally. The main extension direction does not necessarily have to extend over the entire length of the elevator shaft along a single straight line. It is also possible, for example, for the course of the main extension direction to be composed of straight-line sections of which the transition regions can also be rounded.

An in particular elongate reference element is arranged in the elevator shaft. The reference element is in particular flexible, for example in the form of a cord made of plastics material or a wire made of metal. It can, however, also be rigid, for example may be designed as a plastics or metal rail. When inserting the reference element into the elevator shaft, it is in particular fixed in the elevator shaft. As a result, the position of the reference element with respect to the elevator shaft and thus to walls of the elevator shaft is known. The distance at which the reference element is from the various shaft walls of the elevator shaft is therefore known, for example. This information can be used in determining an installation position of shaft material, for example of rail brackets or guide rails. The reference element is aligned in the main extension direction of the elevator shaft, i.e. it extends predominantly in the main extension direction and thus in the vertical direction or in the z direction.

In particular, the first distance sensor is fixedly arranged on the locating system, with the term fixedly being understood to mean that it is stationary relative to the locating system and thus immovably arranged on the locating system. It is in particular designed such that it can measure the first distance, for example in the x direction, and the second distance, for example in the y direction, from the first reference element without contact. The distance sensor can for example be constructed as a 2D scanner, in particular a 2D profile scanner. A 2D profile scanner can be used to determine the profile of a linear measuring range in front of the 2D profile scanner. In particular, the 2D profile scanner is arranged such that the linear measuring range extends in the y direction and the 2D profile scanner can detect the profile in the x direction. If the 2D profile scanner is aligned relative to the reference element such that the reference element is within the measuring range of the 2D profile scanner, the x and y position of the 2D profile scanner and thus of the locating system relative to the reference element can be determined. Using a first distance sensor designed as a 2D profile scanner, a first distance, in particular in the x direction, and a second distance, which is perpendicular to the first distance, in particular in the y direction, from the reference element can thus be measured.

The tilt sensor is also in particular fixedly arranged on the locating system. A tilt sensor can autonomously measure the tilt or rotation relative to the vertical axis or z axis predetermined by gravity, and thus without the use of other, external components, i.e. in particular independently of the elongate reference element(s). Tilt sensors are well known and are available on the market in various designs. They may for example have an internal pendulum body, the position of which is measured electronically, inductively, capacitively or optically. The locating system has a tilt sensor by means of which the rotation about a horizontally extending first axis, for example the x axis, and a horizontally extending second axis that is perpendicular to the first axis, for example the y axis, can be measured. The tilt sensor measures the tilt of the locating system thereby.

In order to determine the position of the locating system in the main extension direction of the elevator shaft, i.e. in particular in the z direction, the locating system has a further measuring system. The position of the locating system in the main extension direction is determined in particular without the use of the first reference element. For this purpose, for example, a measuring system can be used which evaluates the information on a magnetic strip arranged in the elevator shaft and extending in the main extension direction or on a strip having optical evaluable information and determines the position in the main extension direction therefrom. Such measuring systems are well known and are available on the market. In this case, the locating system may for example use a measuring system, by means of which, in the fully installed state, the position of an elevator car can be determined in the main extension direction. It is also possible for a distance from an end of the elevator shaft or from a door opening in the elevator shaft to be determined by means of suitable distance measuring equipment, for example based on an ultrasound or laser measuring method. In addition, there are numerous other options for determining the position of the locating system in the main extension direction.

In an embodiment of the invention, the first distance sensor is constructed and arranged such that it can measure the distances from two reference points on the first reference element, the two reference points being arranged in a defined relationship to one another. Therefore, only one distance sensor and one reference element are necessary for determining the position of the locating system. The locating system is thus particularly cost-effective and the complexity of attaching the reference element in the elevator shaft is very low.

For each of the two reference points, the distance sensor measures a first distance, i.e. in the x direction, and a second distance, i.e. in the y direction. The two reference points are arranged in a known relationship to one another. The reference points in particular are a known distance in the y direction from one another. The two reference points lie, for example, on different edges of a reference element designed as a rail.

From the two said distances in the x direction and the y direction, the control apparatus of the locating system can determine both the positions of the locating system in the x and y directions and the rotation about the vertical axis or z axis. Therefore, the control apparatus can determine all six degrees of freedom of the locating system.

In an embodiment of the invention, the first distance sensor is constructed and arranged such that it can measure a third distance and a fourth distance, which is perpendicular to the third distance, from a second reference element, the first reference element and the second reference element being arranged in a defined relationship to one another.

The second reference element is in particular identical to the second reference element and is arranged in parallel with the first reference element in the elevator shaft, and therefore they are in a defined relationship to one another. The two reference elements are arranged such that the first distance sensor can measure said distances. For example, they are only a relatively small distance of several centimeters from one another.

In an embodiment of the invention, the locating system comprises a second distance sensor, by means of which a third distance and a fourth distance, which is perpendicular to the third distance, from a second reference element can be measured, the first reference element and the second reference element being arranged in a defined relationship to one another. Therefore, the position of the locating system can be determined particularly accurately.

In particular, the second distance sensor is identical to the first distance sensor, and in particular is arranged such that its linear measuring ranges lie on a common straight line. Therefore, the orientations of the first and third distances as well as the second and fourth distances are identical. With the four distances mentioned, the control apparatus can determine both the positions of the locating system in the x and y directions and the rotation about the vertical axis or z axis. Therefore, the control apparatus can determine all six degrees of freedom of the locating system.

The second reference element is in particular identical to the second reference element and is arranged in parallel with the first reference element in the elevator shaft. The two reference elements are thus arranged in a defined relationship to one another.

A locating system according to the invention is particularly advantageously arranged on an installation device for carrying out an installation process in an elevator shaft of an elevator installation. In order for it to be possible to carry out installation steps of an installation process in an elevator shaft, the installation device must know its position in the elevator shaft. This is possible particularly rapidly using a locating system which is in particular fixedly arranged on the installation device, and also during movement of the installation device in the elevator shaft.

The individual elements of the locating system such as the distance sensor, the tilt sensor, the measuring system for determining the position in the main extension direction and the control apparatus can be distributed on the installation device. They therefore do not have to form a unit which is arranged in a common housing, for example. It is also possible for a control apparatus to simultaneously serve as a control apparatus of the locating system and of the installation device.

The installation device in particular comprises a carrier component and an installation component. The carrier component is designed to be moved relative to the elevator shaft and positioned at different heights within the elevator shaft. The installation component is retained on the carrier component and is designed to carry out an installation step as part of the installation process at least partially automatically. The locating system is arranged on the carrier component.

The carrier component of the installation device can be configured in different ways. For example, the carrier component may be designed as a simple platform, a frame, scaffolding, a cab, or the like.

The installation component of the installation device is intended to be mechatronic, i.e. it is intended to have interacting mechanical, electronic, and information-technology elements or modules.

For example, the installation component may have suitable mechanics for making it possible to handle tools within an installation step, for example. Here, the tools may be brought into the installation position by the mechanism, for example, in a suitable manner and/or may be guided in a suitable manner during an installation step. Alternatively, the installation component itself may have a suitable mechanism that forms a tool. Said tool may be designed, for example, as a drill or a screwdriver.

Electronic elements or modules of the mechatronic installation component can for example serve to suitably actuate or control mechanical elements or modules of the installation component. Such electronic elements or modules can thus for example serve as a control apparatus of the installation component. It is also possible to provide further control apparatuses which exchange information with one another, split up control tasks and/or monitor one another. In the following, when referring to a control apparatus, reference is made to one or more of these control apparatuses.

Furthermore, the installation component may have information-technology elements or modules by means of which, for example, it can be derived to which position a tool is intended to be brought and/or how the tool is intended to be operated and/or guided there during an installation step.

Interaction between the mechanical, electronic and information-technology elements or modules takes place in particular such that at least one installation step can be carried out partially automatically or fully automatically by the installation device as part of the installation process.

In particular, a movement component is provided for moving the installation device within the elevator shaft. For example, a drive that is pre-installed in the elevator shaft can be provided as the movement component. The movement component may be designed in different ways in order to be able to move the installation device within the elevator shaft.

For example, the movement component can be fixed to a retaining point at the top inside the elevator shaft and can comprise a support means that can withstand a tensile load, such as a rope, a chain or a belt, one end of which is retained on the movement component and the other end of which is fixed to the carrier component of the installation device.

The installation device may in particular be fixed with respect to shaft walls of the elevator shaft and thus brought into a fixing position. In the fixing position, the carrier component of the installation device is prevented from being able to move in a direction transverse to the main extension direction within the elevator shaft during an installation step in which the installation component operates and exerts lateral forces on the carrier component, for example. For this purpose, the installation device may in particular comprise a fixing component, which can be designed, for example, to be laterally supported or secured against the shaft walls of the elevator shaft such that the carrier component can no longer move in a horizontal direction relative to the shaft walls. For this purpose, the fixing component may for example have suitable supports, rams, levers or the like.

The position of the installation device is determined in particular in the fixing position before an installation step is carried out by the installation device.

The installation device may in particular comprise a further sensor which can be arranged on the installation component and by means of which a distance from a first reference element can be measured. A control apparatus of the installation device is then provided to determine a relative position of the installation device in a fixing position with respect to the first elongate reference element in the elevator shaft using the sensor arranged on the installation component. The control apparatus determines the relative position of the first reference element with respect to at least two different sensor positions and thus positions of the installation component. Depending on the relative position of the installation device with respect to the first reference element, it then determines the fixing position in the elevator shaft. The control apparatus is therefore provided to determine the fixing position and thus the position of the installation device in the elevator shaft also using a method according to WO 2017/167719 A1. This method and the required components are described in detail in WO 2017/167719 A1. The content of WO 2017/167719 A1 is hereby incorporated in full in the present application.

A sensor, which can be arranged on the installation component and by means of which distances can be measured, can in particular not only be used for determining the position of the installation device in the elevator shaft. By means of such a sensor, the course of a shaft wall of the elevator shaft can be determined, for example.

For reasons of time, the position of the installation device in the elevator shaft is intended to be implemented by means of the method according to the invention. In order to nevertheless be able to meaningfully use measured values from a sensor arranged on the installation component, the two methods for determining the position of the installation device must be coordinated with one another. For this purpose, the position of the installation device is determined in particular at three different positions of the installation device in the elevator shaft using both methods. By comparing the results at the different positions, the methods can be coordinated with one another.

The above-mentioned problem is also solved by a method for determining a current position of a locating system in an elevator shaft of an elevator installation extending in a main extension direction, comprising at least the following steps:
- inserting a first elongate reference element into the elevator shaft which is aligned in a main extension direction of the elevator shaft,
- measuring a first distance and a second distance, which is perpendicular to the first distance, from a first reference element using a first distance sensor,
- measuring a rotation of the locating system about a horizontally extending first axis and a horizontally extending second axis that is perpendicular to the first axis,
- determining a position of the locating system in the main extension direction of the elevator shaft and
- determining the current position of the locating system on the basis of said first distance, said second distance, said rotation, and said position in the main extension direction of the elevator shaft.

In an embodiment of the invention, the distances from two reference points on the first reference element are measured by means of the first distance sensor, the two reference points being arranged in a defined relationship to one another and all of said distances being used to determine the current position of the locating system.

In an embodiment of the invention, a third distance and a fourth distance, which is perpendicular to the third distance, from a second reference element are measured by means of the first distance sensor, the first reference element and the second reference element being arranged in a defined relationship to one another.

In an embodiment of the invention, a third distance and a fourth distance, which is perpendicular to the third distance, from a second reference element are measured by means of a second distance sensor. Said third distance and fourth distance are used to determine the current position of the locating system, the first reference element and the second reference element being arranged in a defined relationship to one another.

In an embodiment of the invention, a first common mounting plate is fastened in the elevator shaft, to which first ends of the first and second reference elements are fastened. In this way, a defined distance between the two first ends of the reference elements relative to one another can be set and maintained in a particularly simple manner. In addition, by fastening the mounting plate, the two first ends of the reference elements can be particularly easily fixed in the elevator shaft.

In particular, a second common mounting plate is also fastened in the elevator shaft, to which second ends of the first and second reference elements are fastened. The two reference elements have the same distance from one another in particular on both mounting plates, such that is particularly simple to ensure that both reference elements extend in parallel with one another over their entire length.

The first mounting plate can for example be fastened to the floor of a lowermost door opening of the elevator shaft and the second mounting plate can for example be fastened to the floor or the ceiling of an uppermost door opening. This can be achieved in a simple manner by the reference elements extending through the entire part of the elevator shaft that is significant for the installation device. The installation on the door openings is also particularly simple and safe, since the installer does not have to get into the elevator shaft, but instead the installation is possible from the floor of the levels associated with the door openings.

In an embodiment of the invention, the first and/or second reference element is fixed between its ends in order to reduce vibrations relative to the elevator shaft. In particular in high elevator shafts and thus long reference elements, there may be the risk that the reference elements are excited to vibrate, which can make the determination of the fixing position of the installation device inaccurate. By the reference element being fixed once or more between its two ends, for example relative to a shaft wall of the elevator shaft, such vibration can be prevented or at least reduced. This allows the fixing position to be determined particularly accurately, in particular in high elevator shafts.

An alternative locating system may also be constructed without a tilt sensor. Such a locating system may, for example, comprise two distance sensors, which are arranged so as to be spaced apart from one another in the vertical direction or z direction, with it being possible for each distance sensor to measure two distances from two reference points on a reference element. In a further embodiment of such a locating system, the locating system may comprise three distance sensors, which are arranged so as to be spaced apart from one another in the vertical direction or z direction and in the horizontal direction, for example in the y direction. In this case, two distance sensors measure the distances from a first reference element and the third distance sensor measures the distances from a second reference element.

Further advantages, features and details of the invention will become apparent from the following description of embodiments and with reference to the drawings, in which identical or functionally identical elements are provided with identical reference signs. The drawings are only schematic and are not to scale.

DESCRIPTION OF THE DRAWINGS

In the drawings:

FIG. 1 is a view from above of a locating system,

FIG. 2 is a plan view of the locating system from FIG. 1,

FIG. 3 is a view from above of an alternative locating system,

DETAILED DESCRIPTION

Figure 4:
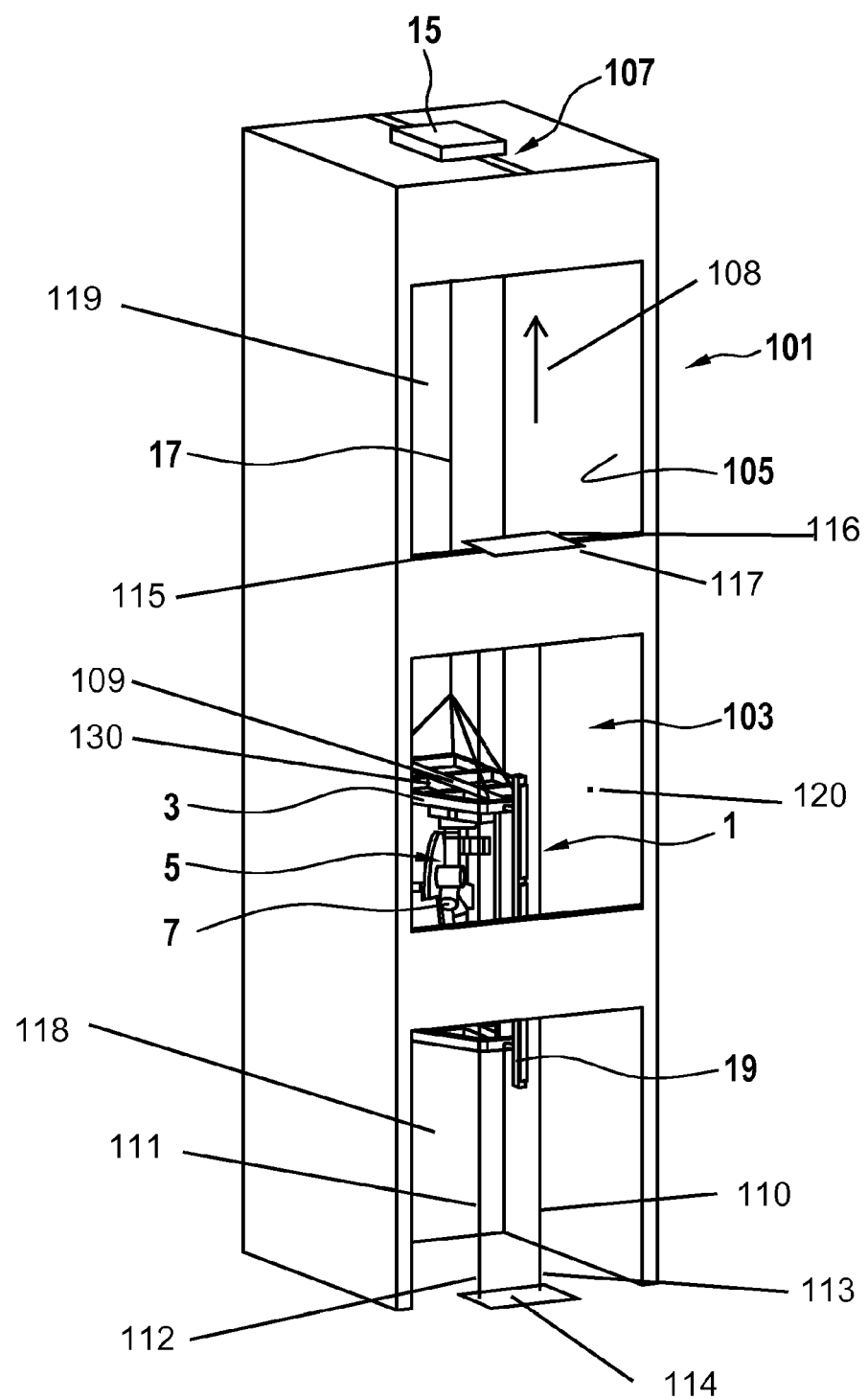
FIG. 4 is a perspective view of an elevator shaft of an elevator installation comprising an installation device received therein.

For improved understanding, FIG. 1 and FIG. 2 show an orthogonal coordinate system having an x, y and z axis, which are each perpendicular to one another. The x and y axes extend horizontally and the z axis extends vertically.

According to FIG. 1 and FIG. 2, a locating system 30 for determining a current position in an elevator shaft 103, delimited by shaft walls 105, of an elevator installation has a primarily cuboid main body 32, on which a first arm 34 protruding to the right in FIG. 1 and FIG. 2 and a second arm 36 protruding to the left in FIG. 1 and FIG. 2 are arranged on two opposite sides. The arms 34, 36 thus extend in the y direction. At the ends of the arms 34, 36 remote from the main body 32, a first distance sensor 38 is arranged on the right-hand arm 34 and a second distance sensor 40 is arranged on the left-hand arm 36, which sensors are oriented in the x direction. The two distance sensors 38, 40 are designed as 2D profile scanners.

A first elongate reference element 110 and a second elongate reference element 111 are arranged in the elevator shaft 103 in the form of cords. The reference elements 110, 111 extend vertically in the elevator shaft 103 and thus in a main extension direction 108 and in the z direction. The reference elements 110, 111 are each fixed to a shaft wall 105 of the elevator shaft 103, in each case by a rod-shaped fixing 126, which is only shown in FIG. 2 for reasons of clarity.

The first distance sensor 38 is arranged such that it can measure a first distance dx1 in the x direction and a second distance dy1 in the y direction from the first reference element 110. The second distance sensor 40 is arranged such that it can measure a third distance dx2 in the x direction and a fourth distance dy2 in the y direction from the second reference element 111. The measured distances dx1, dy1, dx2, dy2 are transferred from the distance sensors 38, 40 to a control apparatus 42, which evaluates said distances.

The control apparatus 42 determines, from the distances dx1, dy1, dx2, dy2, the positions of the locating device 30 relative to the reference elements 110, 111 in the x and y directions. Since the reference elements 110, 111 have been arranged at defined known positions in the elevator shaft 103, the position of the locating system 30 in the x and y direction in the elevator shaft 103 is thus also known. The control apparatus 42 also determines, from the distances dx1, dy1, dx2, dy2, the rotation of the locating device 30 about the z axis, i.e. the yaw angle. In the example shown, the distances of the two reference elements 110, 111 from the two distance sensors 38, 40 are the same in each case, such that there is no rotation about the z axis, and the yaw angle is thus 0.

A tilt sensor 44 is also arranged on the main body 32 of the locating system 30. The tilt sensor 44 measures the rotations of the main body 32 and thus of the locating system 30 about the x and y axis and transfers the measured rotations to the control apparatus 42. The rotation about the x axis corresponds to the roll angle and the rotation about the y axis corresponds to the pitch angle. In the example shown, the locating system 30 does not have rotation about the x axis or the y axis, and therefore the roll angle and the pitch angle are each 0.

In order to determine the position of the locating system 30 in the z direction and thus in the main extension direction 108 of the elevator shaft 103, a magnetic strip 46 extending in the z direction is arranged in the elevator shaft 103. The magnetic strip 46 contains height information in encoded form, i.e. information about the position in the z direction. In order to make it possible to read out this height information from the magnetic strip 46, a measuring system 48 is arranged on the main body 32 through which the magnetic strip 46 is passed. The measuring system 48 thus determines the position of the main body 32 and thus of the locating system 30 in the main extension direction 108 of the elevator shaft 103 and transfers this information to the control apparatus 42.

From the measured values from the two distance sensors 38, 40, the tilt sensor 44 and the measuring system 48, the control apparatus 42 thus determines the x, y and z positions, as well as the rotations about the x, y and z axes of the locating system 30.

In order to determine the current position of the locating system 30 in the elevator shaft 103, the two reference elements 110, 111 are first inserted into the elevator shaft, then said distances from the reference elements 110, 111 are measured using the distance sensors 38, 40 and said rotations are measured using the tilt sensor 44 and the position of the locating system 30 in the main extension direction 108 of the elevator shaft 103 is determined using the measuring system 48. The control apparatus 42 then determines the position of the locating system 30 in the elevator shaft 103 on the basis of this information.

A locating system 230 shown in FIG. 3 is very similar to the locating system 30 from FIG. 1 and FIG. 2, which is why only the differences from the locating system 30 from FIG. 1 and FIG. 2 will be discussed.

The locating system 230 has only a single distance sensor 238, which is arranged directly on the main body 232 of the locating system 230. The distance sensor 238 is aligned with only a single reference element 210 in the elevator shaft 103. The reference element 210 is designed as a rail that extends in the main extension direction 108 of the elevator shaft 103. In each case, the distance sensor 238 measures two distances from two reference points 250, 252, which are located on opposite edges of the reference element 210 and are thus arranged in a defined relationship to one another. From the measured distances, as described above, the control apparatus 242 can determine the position of the locating system 230 in the x and y directions as well as the yaw angle.

Instead of the single reference element designed as a rail, it is also possible to arrange two reference elements in the form of cords in the elevator shaft, which extend along the edges of the rail shown in FIG. 4. The position of the locating system is then determined in an analogous manner to when a rail is used.

FIG. 4 shows an installation device 1 comprising a locating system 130 in an elevator shaft 103 of an elevator installation 101. The installation device 1 comprises a carrier component 3 and a mechatronic installation component 5. The carrier component 3 is designed as a frame on which the mechatronic installation component 5 is mounted. This frame has dimensions which make it possible to move the carrier component 3 within the elevator shaft 103 in a main extension direction 108 of the elevator shaft 103 and thus vertically in this case, i.e., for example, to move to different vertical positions at different floors within a building. In the example shown, the mechatronic installation component 5 is constructed as an industrial robot 7, which is attached to the frame of the carrier component 3 by means of a retaining device 109 so as to hang down. In this case, an arm of the industrial robot 7 can be moved relative to the carrier component 3 and, for example, can be moved towards a wall 105 of the elevator shaft 103.

The carrier component 3 is connected to a movement component 15 in the form of a motor-driven winch by means of a steel cable serving as a support means 17, which winch is attached to the top of the elevator shaft 103 at a retaining point 107 on the ceiling of the elevator shaft 103. By means of the movement component 15, the installation device 1 can be moved within the elevator shaft 103 in the main extension direction 108, i.e. vertically over the entire length of the elevator shaft 103.

The installation device 1 further comprises a fixing component 19, by means of which the carrier component 3 can be fixed within the elevator shaft 103 in the lateral direction, i.e. in the horizontal direction. The carrier component 3 is thus brought into a fixing position, in which the carrier component 3 is shown in FIG. 4. The fixing component 19 on the front of the carrier component 3 and/or ram (not shown) on a rear side of the carrier component 3 can be moved outwards forward or backward and in this way can secure the carrier component 3 between walls 105 of the elevator shaft 103. The fixing component 19 and/or the rams can be expanded outwards, for example by means of a hydraulic system or the like, in order to fix the carrier component 3 in the elevator shaft 103 in the horizontal direction.

Two elongate reference elements 110 and 111 in the form of cords, which are inserted before the insertion of the installation device 1 in the elevator shaft 103, extend within the elevator shaft 103. First, lower ends 112, 113 of the reference elements 110, 111 are fastened to a first, lower mounting plate 114, and second, upper ends 115, 116 of the reference elements 110, 111 are fastened to a second, upper mounting plate 117. The two reference elements 110, 111 have the same spacing on both mounting plates 114, 117 such that they extend in parallel with one another. The lower mounting plate 114 is fastened to the floor of a lowermost door opening 118 and the upper mounting plate 117 is fastened to the floor of an uppermost door opening 119 such that the reference elements 110, 111 extend within the elevator shaft 103 in the main extension direction 108. Thus, the position of the reference elements 110, 111 relative to the walls 105 of the elevator shaft 103 is known.

Figure 5:
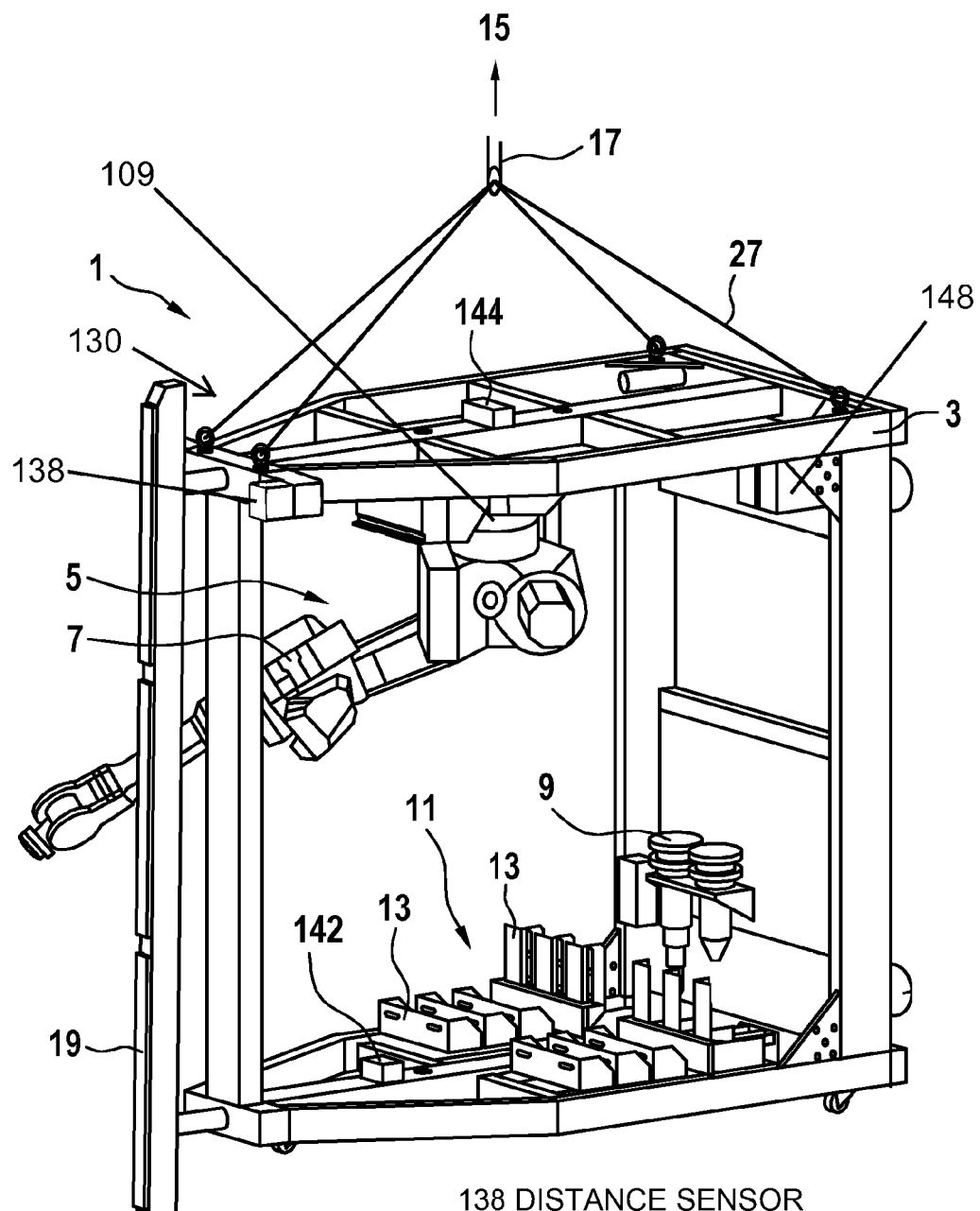
FIG. 5 is a perspective view of an installation device.

FIG. 5 is an enlarged view of an installation device 1 according to an embodiment of the present invention.

The carrier component 3 is designed as a cage-like frame in which a plurality of horizontally and vertically extending beams form a mechanically loadable structure.

Guy cables 27 which can be connected to the support means 17 are attached to the top of the cage-like carrier component 3. By moving the support means 17 within the elevator shaft 103, i.e. for example by winding up or unwinding the bendable support means 17 onto or from the winch of the movement component 15, the carrier component 3 can thus be moved so as to be suspended within the elevator shaft 103 in the main extension direction 108 and thus can be moved vertically.

The fixing component 19 is provided on the side of the carrier component 3. In the example shown, the fixing component 19 is formed with an elongate beam extending in the vertical direction, which beam can be moved in the horizontal direction with respect to the frame of the carrier component 3. For this purpose, the beam can be attached to the carrier component 3 by a blockable hydraulic cylinder or a self-locking motor spindle, for example. When the beam of the fixing component 19 is moved away from the frame of the carrier component 3, it moves laterally towards one of the walls 105 of the elevator shaft 103. Alternatively or additionally, rams could be moved backwards on the rear side of the carrier component 3 in order to expand the carrier component 3 in the elevator shaft 103. In this way, the carrier component 3 can be secured within the elevator shaft 103 and the carrier component 3 can thus be fixed within the elevator shaft 103 in the lateral direction and thus in the fixing position while an installation step is being carried out, for example. Forces which are introduced onto the carrier component 3 can be transferred in this state to the walls 105 of the elevator shaft 103, preferably without the carrier component 3 being able to move within the elevator shaft 103 or starting to vibrate.

In the embodiment shown, the mechatronic installation component 5 is implemented by means of an industrial robot 7. It should be noted, however, that the mechatronic installation component 5 can also be implemented in other ways, for example with differently designed actuators, manipulators, effectors, etc. In particular, the installation component could have mechatronics or robotics adapted especially for use in an installation process within an elevator shaft 103 of an elevator installation 1.

In the example shown, the industrial robot 7 is equipped with a plurality of robot arms that are pivotable about pivot axes. For example, the industrial robot can have at least six degrees of freedom, i.e. an installation tool 9 guided by the industrial robot 7 can be moved with six degrees of freedom, i.e. with three rotational degrees of freedom and three translational degrees of freedom, for example. For example, the industrial robot can be designed as a vertical articulated robot, a horizontal articulated robot, a SCARA robot or a Cartesian robot or gantry robot.

The free end of the robot can be coupled to various installation tools or sensors 9. The installation tools or sensors 9 may differ in terms of their design and intended use. The installation tools or sensors 9 can be retained on the carrier component 3 such that the free end of the industrial robot 7 can be brought towards said tools or sensors and coupled to one of them.

A sensor 9 may be designed as a laser scanner, by means of which a distance from a component, such as the reference elements 110, 111 or a shaft wall 105, can be measured. The industrial robot 7 can be coupled to such a sensor 9. In order to determine the position of the carrier component 3 and thus of the installation device 1, the sensor 9 can be brought in particular into at least two different positions relative to the reference elements 110, 111.

One of the assembly tools 9 may be designed as a drilling tool, similar to a drill. By coupling the industrial robot 7 to such a drilling tool, the installation component 5 can be configured to allow holes to be drilled in an at least partially automatically controlled manner, for example in one of the walls 105 of the elevator shaft 103. In this case, the drilling tool can for example be moved and handled by the industrial robot 7 such that the drilling tool drills holes using a drill at a designated position, a mounting position 120 in FIG. 4, for example in concrete of the wall 105 of the elevator shaft 103, into which, for example, fastening screws can subsequently be screwed for fixing fastening elements.

Furthermore, a magazine component 11 can be provided on the carrier component 3. The magazine component 11 can serve to store components 13 to be installed and to provide the installation component 5.

In order for it to be possible to determine the position of the carrier component 3 of the installation device 1 within the elevator shaft 103, the installation device 1 comprises a locating system 130. The locating system 130 is not designed as a modular unit, but instead the individual elements of the locating system 130 are distributed over the carrier component 3.

Two distance sensors are arranged so as to be oriented at the top of the carrier component 3 and in the direction of the fixing component 19, although only a first distance sensor 138 can be seen in FIG. 5. By means of the distance sensors, two distances from the reference elements 110, 111 can be measured in each case.

A tilt sensor 144 is arranged above the retaining device 109 of the industrial robot 7, by means of which sensor the tilt of the carrier component 3 relative to the vertical can be measured. In addition, a measuring system 148 is arranged on the side of the carrier component 3 facing away from the fixing element 19, which measuring system can read out height information from a magnetic strip (not shown in FIG. 4 and FIG. 5) and can thus determine the position of the carrier component 3 in the main extension direction 108 of the elevator shaft 103.

The information from the distance sensors 138, the tilt sensor 144, and the measurement system 148 is evaluated by a control apparatus 142. The control apparatus 142 determines the position of the carrier component 3 in the elevator shaft 103, as described above.

Finally, it should be noted that terms such as "having," "comprising," etc., do not exclude other elements or steps, and terms such as "a" or "an" do not exclude a plurality. It should also be noted that features or steps which have been described with reference to one of the above embodiments can also be used in combination with other features or steps of other above-described embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A locating system for determining a current position thereof in an elevator shaft of an elevator installation extending in a main extension direction, the locating system comprising:
    a first distance sensor for measuring a first distance and a second distance of the locating system, the second distance being perpendicular to the first distance, from a first reference element in the elevator shaft, wherein the first distance sensor is constructed as a 2D profile scanner;
    a tilt sensor for measuring a rotation of the locating system about a horizontally extending first axis and a horizontally extending second axis that is perpendicular to the first axis;
    a measuring system for determining a position of the locating system relative to the main extension direction of the elevator shaft; and
    a control apparatus generating the current position of the locating system based upon the measured first and second distances, the measured rotation and the determined position relative to the main extension direction wherein the first distance sensor remains in a fixed position relative to the first reference element when measuring the first and second distances.

2. The locating system according to claim 1 wherein the first distance sensor is arranged to measure the first and second distances from two reference points on the first reference element, the two reference points being arranged in a defined relationship to one another.

3. The locating system according to claim 1 wherein the first distance sensor is arranged to measure a third distance and a fourth distance, the fourth distance being perpendicular to the third distance, from a second reference element in the elevator shaft, the first reference element and the second reference element being arranged in a defined relationship to one another.

4. The locating system according to claim 1 including a second distance sensor for measuring a third distance and a fourth distance, the fourth distance being perpendicular to the third distance, from a second reference element in the elevator shaft, the first reference element and the second reference element being arranged in a defined relationship to one another.

5. The locating system according to claim 4 wherein the second distance sensor is constructed as a 2D profile scanner.

6. An installation device for carrying out an installation process in an elevator shaft of an elevator installation comprising the locating system according to claim 1 arranged on the installation device and the installation device being movable in the elevator shaft.

7. The installation device according to claim 6 including a carrier component and an installation component, the carrier component being movable relative to the elevator shaft and positioned at different heights within the elevator shaft, the installation component being retained on the carrier component and being adapted to carry out an installation step as part of the installation process at least partially automatically, and wherein the locating system is arranged on the carrier component.

8. The installation device according to claim 7 including a sensor arranged on the installation component for measuring a distance from the first reference element and the control apparatus for determining:
    a relative position of the installation device in a fixing position with respect to the first reference element in the elevator shaft using the sensor arranged on the installation component;
    a relative position of the first reference element with respect to at least two different positions of the sensor arranged on the installation component corresponding to associated positions of the installation device; and
    the fixing position in the elevator shaft based on the determined relative position of the installation device with respect to the first reference element.

9. A method for determining a current position of a locating system in an elevator shaft of an elevator installation extending in a main extension direction, the method comprising the following steps:
    inserting an elongate first reference element into the elevator shaft aligned in the main extension direction of the elevator shaft;
    measuring a first distance and a second distance of the locating system, which second distance is perpendicular to the first distance, from the first reference element using a first distance sensor;
    measuring a rotation of the locating system about a horizontally extending first axis and a horizontally extending second axis that is perpendicular to the first axis;
    determining a position of the locating system in the main extension direction of the elevator shaft;
    determining a current position of the locating system based on the first distance, the second distance, the rotation, and the position in the main extension direction of the elevator shaft; and
    wherein the first distance sensor remains in a fixed position relative to the first reference element when measuring the first distance and the second distance.

10. The method according to claim 9 including measuring the first and second distances from two reference points on the first reference element with the first distance sensor, the two reference points being arranged in a defined relationship to one another.

11. The method according to claim 9 including measuring a third distance and a fourth distance, the fourth distance being perpendicular to the third distance, from an elongate second reference element in the elevator shaft with the first distance sensor, the first reference element and the second reference element being arranged in a defined relationship to one another.

12. The method according to claim 11 including fastening a first mounting plate in the elevator shaft and fastening first ends of the first and second reference elements to the first mounting plate.

13. The method according to claim 12 including fastening a second mounting plate in the elevator shaft and fastening second ends of the first and second reference elements to the second mounting plate.

14. The method according to claim 9 including measuring a third distance and a fourth distance, the fourth distance being perpendicular to the third distance, from an elongate second reference element in the elevator shaft with a second distance sensor, the first reference element and the second reference element being arranged in a defined relationship to one another, and further basing the determining of the current position of the locating system on the third distance and the fourth distance.

15. The method according to claim 14 including fastening a first mounting plate in the elevator shaft and fastening first ends of the first and second reference elements to the first mounting plate.

16. The method according to claim 15 including fastening a second mounting plate in the elevator shaft and fastening second ends of the first and second reference elements to the second mounting plate.

17. The method according to claim 9 including fixing at least one of the first reference element and a second reference element in the elevator shaft between ends thereof to reduce vibrations of the first and/or second reference element relative to the elevator shaft.

\* \* \* \* \*